(12) United States Patent
Betsuno et al.

(10) Patent No.: US 12,073,089 B2
(45) Date of Patent: Aug. 27, 2024

(54) STORAGE DEVICE AND DATA RECOVERY METHOD BY STORAGE DEVICE

(71) Applicant: Hitachi, Ltd., Tokyo (JP)

(72) Inventors: Kenichi Betsuno, Tokyo (JP); Akira Yamamoto, Tokyo (JP); Takashi Nagao, Tokyo (JP); Kazuki Matsugami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/947,905

(22) Filed: Sep. 19, 2022

(65) Prior Publication Data

US 2023/0297242 A1 Sep. 21, 2023

(30) Foreign Application Priority Data

Mar. 17, 2022 (JP) ................................. 2022-042708

(51) Int. Cl.
*G06F 3/06* (2006.01)
*G06F 11/10* (2006.01)
*G06F 12/02* (2006.01)

(52) U.S. Cl.
CPC .......... *G06F 3/0616* (2013.01); *G06F 3/0631* (2013.01); *G06F 11/10* (2013.01); *G06F 3/0683* (2013.01); *G06F 12/0253* (2013.01)

(58) Field of Classification Search
None
See application file for complete search history.

(56) References Cited

U.S. PATENT DOCUMENTS

| | | | | |
|---|---|---|---|---|
| 5,488,701 A | * | 1/1996 | Brady ................... | G11C 29/74 714/6.24 |
| 6,745,284 B1 | * | 6/2004 | Lee ........................ | G06F 3/0613 711/208 |
| 6,862,692 B2 | * | 3/2005 | Ulrich ................. | G06F 11/1076 714/6.24 |
| 2015/0205669 A1 | * | 7/2015 | Sundaram ........... | G06F 11/1092 714/6.23 |
| 2016/0274973 A1 | * | 9/2016 | Sundaram ........... | G06F 11/1076 |
| 2016/0292025 A1 | * | 10/2016 | Gupta .................. | G06F 3/0688 |
| 2018/0074951 A1 | * | 3/2018 | Feigin ................. | G06F 12/0246 |

OTHER PUBLICATIONS

Patterson et al., "A Case for Redundant Arrays of Inexpensive Disks (RAID)", ACM (1988), pp. 109-116.

* cited by examiner

*Primary Examiner* — Yaima Rigol
(74) *Attorney, Agent, or Firm* — Foley & Lardner LLP

(57) ABSTRACT

A storage device manages data stored in a storage drive in a plurality of logical hierarchies. The plurality of logical hierarchies include a writing hierarchy above a hierarchy of a parity group including a plurality of storage drives. The storage device writes received host data in a free area in the writing hierarchy. In the data recovery process for replacing a failure storage drive with a new storage drive, the storage device executes the garbage collection process on a first logical area in the writing hierarchy associated with the first parity group including the failure storage drive. In the garbage collection process, valid data is selected from the first logical area and copied to a second logical area associated with a second parity group different from the first parity group.

3 Claims, 10 Drawing Sheets

FIG. 4

| HOST LBA | PAGE NUMBER | IN-PAGE ADDRESS RANGE |
|---|---|---|
| 0x1000—0x2000 | 10 | 0x0100—0x0900 |
| 0x2000—0x3000 | 11 | 0x0000—0x0100 |
| 0x3000—0x4000 | 11 | 0x0100—0x0B00 |
| ... | ... | ... |

FIG. 5

| PAGE NUMBER | LOGICAL ADDRESS | PHYSICAL ADDRESS | PRE-COMPRESSION SIZE | POST-COMPRESSION SIZE |
|---|---|---|---|---|
| 10 | 0x0100 | 0xA000 | 0x10 | 0x05 |
| 10 | 0x0110 | 0xA005 | 0x10 | 0x05 |
| ... | ... | ... | ... | ... |

FIG. 6

| PAGE NUMBER | PARITY GROUP NUMBER | IN-PARITY GROUP ADDRESS RANGE | GARBAGE AMOUNT | PREVIOUS POSTSCRIPT POSITION |
|---|---|---|---|---|
| 10 | 20 | 0xA000—0xC000 | 100 | 0x0900 |
| 11 | 21 | 0x0000—0x2000 | 500 | 0x0B00 |
| ... | ... | ... | ... | |

FIG. 7

| PARITY GROUP NUMBER | PARITY TYPE | BELONGING DRIVE NUMBER |
|---|---|---|
| 20 | RAID6 | 0, 1, 2, 3 |
| 21 | RAID10 | 4, 5, 6, 7 |
| ... | | ... |

STORAGE DEVICE AND DATA RECOVERY METHOD BY STORAGE DEVICE

CLAIM OF PRIORITY

The present application claims priority from Japanese patent application JP2022-042708 filed on Mar. 17, 2021, the content of which is hereby incorporated by reference into this application.

BACKGROUND OF THE INVENTION

1. Field of the Invention

The present invention relates to data recovery in a storage device.

2. Description of the Related Art

In a storage method, it is required to maintain data redundancy and continue operation even when some physical drives break down. As a technique for realizing this, for example, David A. Patterson, Garth A. Gibson, and Randy H. Katz, "A case for redundant arrays of inexpensive disks (RAID)", In Proceedings of the 1988 ACM SIGMOD International Conference on Management of Data, Chicago, Illinois, September 1988, P. 109-116 discloses a technique for enabling data restoration by restoring data recorded in a broken drive from data recorded in a drive paired with the broken drive to a replaced drive using a redundant code called parity even when a drive breakdown occurs in a storage method.

In addition, as a means for reducing the cost required for the storage medium of the storage method, a data reduction technology such as a data compression technology and a deduplication technology has become widespread. When these data reduction technologies are applied, a difference forms between the data size written from the host to the storage method and the data size actually written to the storage medium. Therefore, in order to effectively use the storage area of the storage medium, a write-once data storage method (e.g., Log-Structured Storage) is used in which data after application of data reduction is written in a free area in a front justified manner.

In the write-once data storage method, when data is updated, access cannot be made to data before update. Data in such a state is referred to as garbage. As the host repeats data update and the storage system continues writing data, a free area in the storage system decreases. Therefore, after selecting an area including garbage and copying valid data to another free area, it is necessary to periodically perform a process (garbage collection) of releasing the area and making the region reusable to secure the free area.

SUMMARY OF THE INVENTION

When a failure occurs in a drive in the storage system, it is necessary to regenerate (collection copy) data recorded in the broken drive based on data in a normal drive in the same parity group, and re-record the data again in the replaced drive. In the write-once data storage method, as the garbage included in the physical drive increases, the proportion of the collection copy process with respect to data that is originally unnecessary increases in the data regeneration process at the time of the drive breakdown. As a result, the time required for the collection copy process is extended.

If another drive breaks down during recovery from a drive breakdown, data loss may occur. Therefore, in order to maintain the robustness of the system, it is required to shorten the time required for drive recovery.

One aspect of the present invention is a storage device that manages data stored in a storage drive in a plurality of logical hierarchies, the storage device including: a host interface that communicates with a host; and a processor, in which the plurality of logical hierarchies include a writing hierarchy above a hierarchy of a parity group including a plurality of storage drives, the processor writes host data received via the host interface to a free area in the writing hierarchy, and in a data recovery process for replacing a failure storage drive to a new storage drive, executes a garbage collection process on a first logical area in the writing hierarchy associated with a first parity group including the failure storage drive, and in the garbage collection process, valid data is selected from the first logical area and copied to a second logical area associated with a second parity group different from the first parity group.

According to one aspect of the present invention, in the storage system adopting the write-once data storage method, it is possible to shorten the redundancy reduction period involved in the drive breakdown and reduce the possibility of data loss.

BRIEF DESCRIPTION OF THE DRAWINGS

FIG. 4 is a diagram illustrating a host address management table according to an example;

FIG. 5 is a diagram illustrating a metadata management table according to an example;

FIG. 6 is a diagram illustrating a page management table according to an example;

FIG. 7 is a diagram illustrating a parity group management table according to an example;

DESCRIPTION OF THE PREFERRED EMBODIMENTS

Hereinafter, examples of the present invention will be described with reference to the drawings. In the accompanying drawings, functionally same elements may be denoted with the same numbers. The accompanying drawings illustrate specific embodiments and examples in accordance with the principles of the present invention. The embodiments and examples are for the understanding of the present invention and should not be used for restrictive interpretation of the present invention.

In addition, in the following description, in a case where the same type of elements are described without being distinguished, a common reference sign among the reference signs may be used, and in a case where the same type of elements are distinguished, a reference sign (or an ID (e.g., an identification number) of the element) may be used. For example, when a plurality of pages are not distinguished, they are described as "page 70", whereas when each page is distinguished, it is described as "page 70A", "page 70B", and the like. The same applies to other elements.

In the present example, the storage device adopts a write-once data storage method. In the present example, a method of shortening a drive recovery time by garbage collection when a drive failure occurs will be described.

Figure 1:
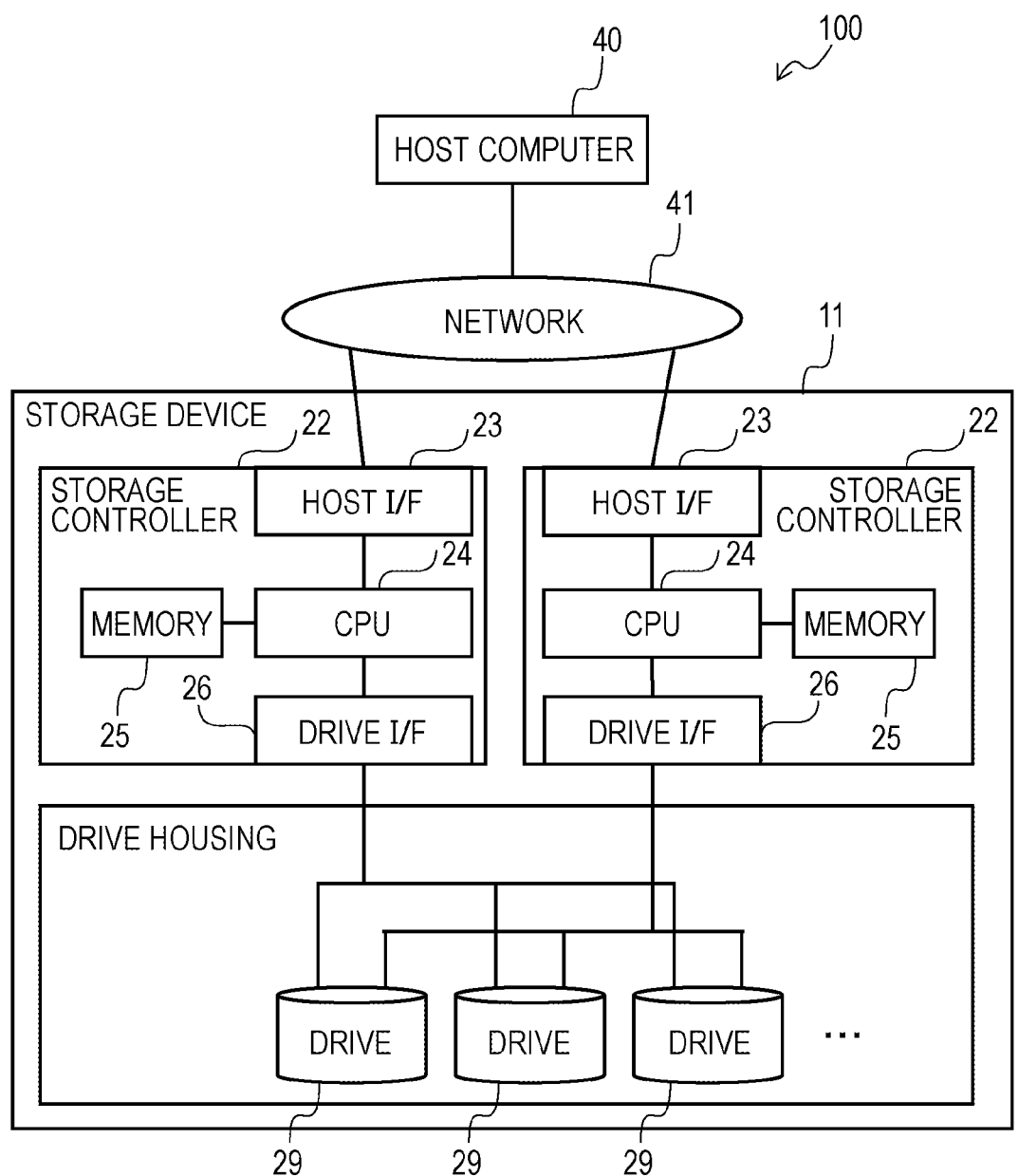
FIG. 1 is a diagram illustrating a hardware configuration of a storage system according to an example.

FIG. 1 is a diagram illustrating an outline of a storage system 100 according to an example of the present specification. The storage system 100 includes a storage device 11 and a host computer 40 connected to the storage device 11. The host computer 40 is connected to the storage device 11 by way of a network 41. The host computer 40 may be a physical computer or a virtual computer executed on a physical computer. In addition, the host computer 40 may be a virtual computer executed in the storage system.

The storage device 11 includes one or more storage controllers 22 and a plurality of drives 29 connected to the one or more storage controllers 22. In the configuration example of FIG. 1, the storage device 11 includes two storage controllers 22.

The storage controller 22 includes a host interface (I/F) 23 that communicates with the host computer 40, a CPU 24 that controls the entire device, a memory 25 that stores programs and information used by the CPU 24, and a drive I/F 26 that communicates with a physical storage drive 29 (also simply referred to as a drive). The number of these components is arbitrary. In the configuration example illustrated in FIG. 1, the plurality of drives 29 are accommodated in a drive housing. The drive 29 is, for example, a device having a nonvolatile data storage medium, and may be a solid state drive (SSD) or a hard disk drive (HDD).

Figure 2:
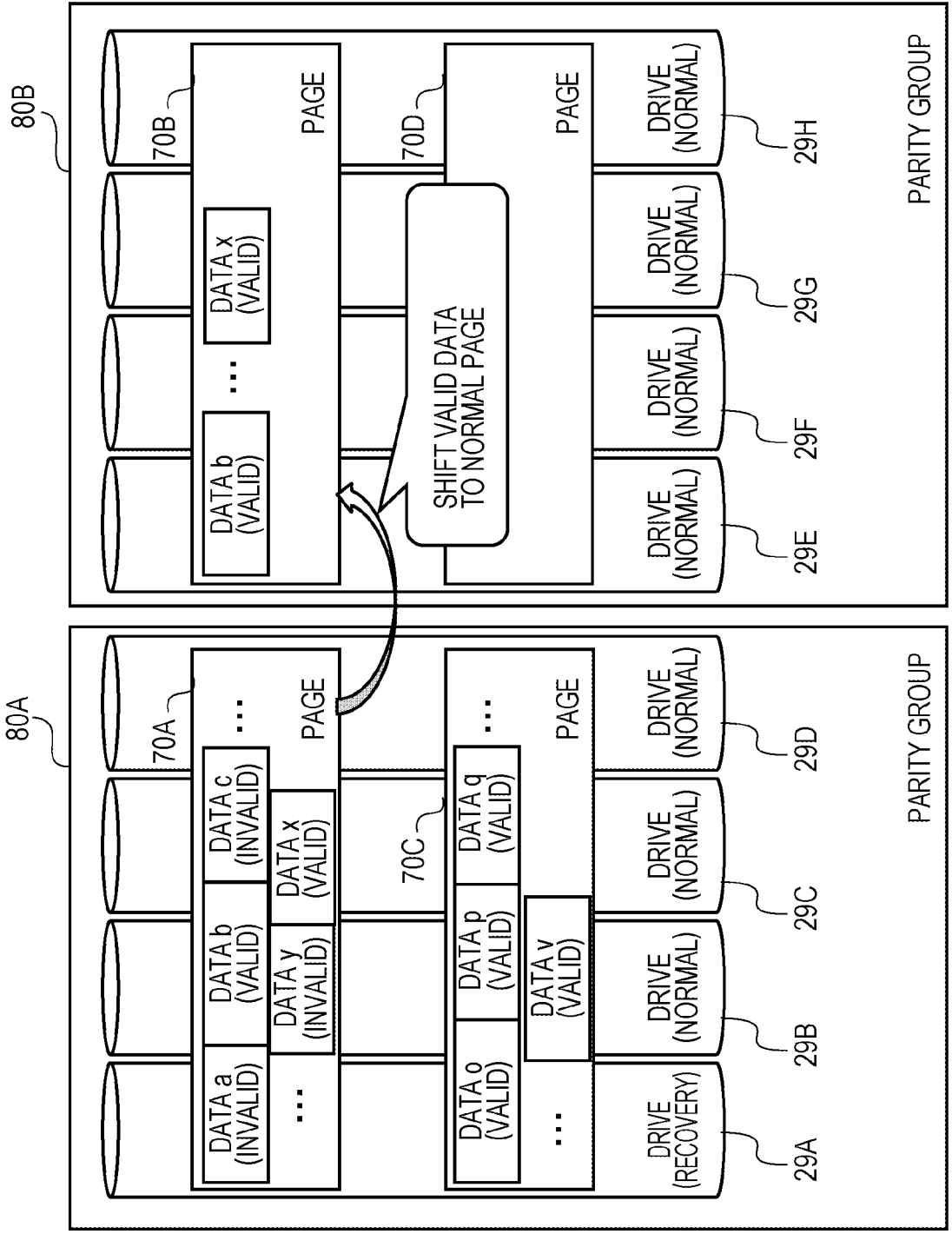
FIG. 2 is a diagram for explaining an outline of a data recovery process in an example.

FIG. 2 is a diagram illustrating an outline of a process according to an example of the present specification. A plurality of drives constitute one parity group. The parity group is also referred to as a redundant arrays of inexpensive disks (RAID) group. In the configuration example of FIG. 2, the drives 29A to 29D constitute a parity group 80A, and the drives 29E to 29H constitute a parity group 80B.

In the parity group, host data (user data) received from the host computer 40 and a redundant code (referred to as parity) generated from the host data are stored in a distributed manner in a drive. Even when a drive breakdown occurs in the parity group, the data recorded in the broken drive can be restored from the data recorded in another drive in the parity group by using the parity. The number of host data blocks for generating the parity and the number of generated parities can be determined by design.

A process in which the drive 29A of the parity group 80A is a data to be recovered, the drive 29A is replaced with another drive, and data is recovered will be described with reference to FIG. 2. The CPU 24 checks the amount of garbage included in each page allocated to the parity group 80A including the drive 29A for each page, and sets the page as a garbage collection target to be described later when the garbage amount is greater than or equal to a predetermined threshold value.

As will be described later, a page is a unit of a logical storage area for management in a pool. The page in the pool stores host data and does not store parity. The page is uniquely allocated to a storage area of one parity group. In the following description, the page size is constant, but may not be constant.

For example, page 70A stores host data a to host data x. The page 70A includes a garbage amount greater than or equal to a threshold value, and the garbage collection process is executed. Note that the target page of the garbage collection process may be determined regardless of the garbage amount, and all the pages of the parity group 80A may be subjected to the garbage collection process.

The CPU 24 transfers valid data (in FIG. 2, data b and data x) among the host data included in the page 70A to the normal page. Here, the normal page is the page 70 allocated to the parity group 80 that does not include the broken drive 29 in the parity group 80 in the storage device 11. In the example of FIG. 2, for example, the page 70B allocated to the parity group 80B corresponds to the normal page.

When the transfer of all the valid data included in the page 70A is completed, the CPU 24 transitions the page 70A to an unused page.

The CPU 24 does not perform the garbage collection process on the page 70 in which the garbage amount is less than the threshold value among the pages 70 allocated to the parity group 80A, and performs data restoration by collection copy. In FIG. 2, the page 70C is a page in which the garbage amount is less than the threshold value. Here, the CPU 24 reads the data and the parity recorded in the normal drives 29B, 29C, and 29D in the parity group 80A, restores the data and the parity for the drive 29A from the data and the parity, and stores the same in the replaced drive 29A.

At the time point when these processes are completed, the data included in each page 70 allocated to the parity group 80A has been transferred to the normal page 70 or has been restored by the collection copy process, and thus the recovery process is completed.

<Logical Composition>

Figure 3:
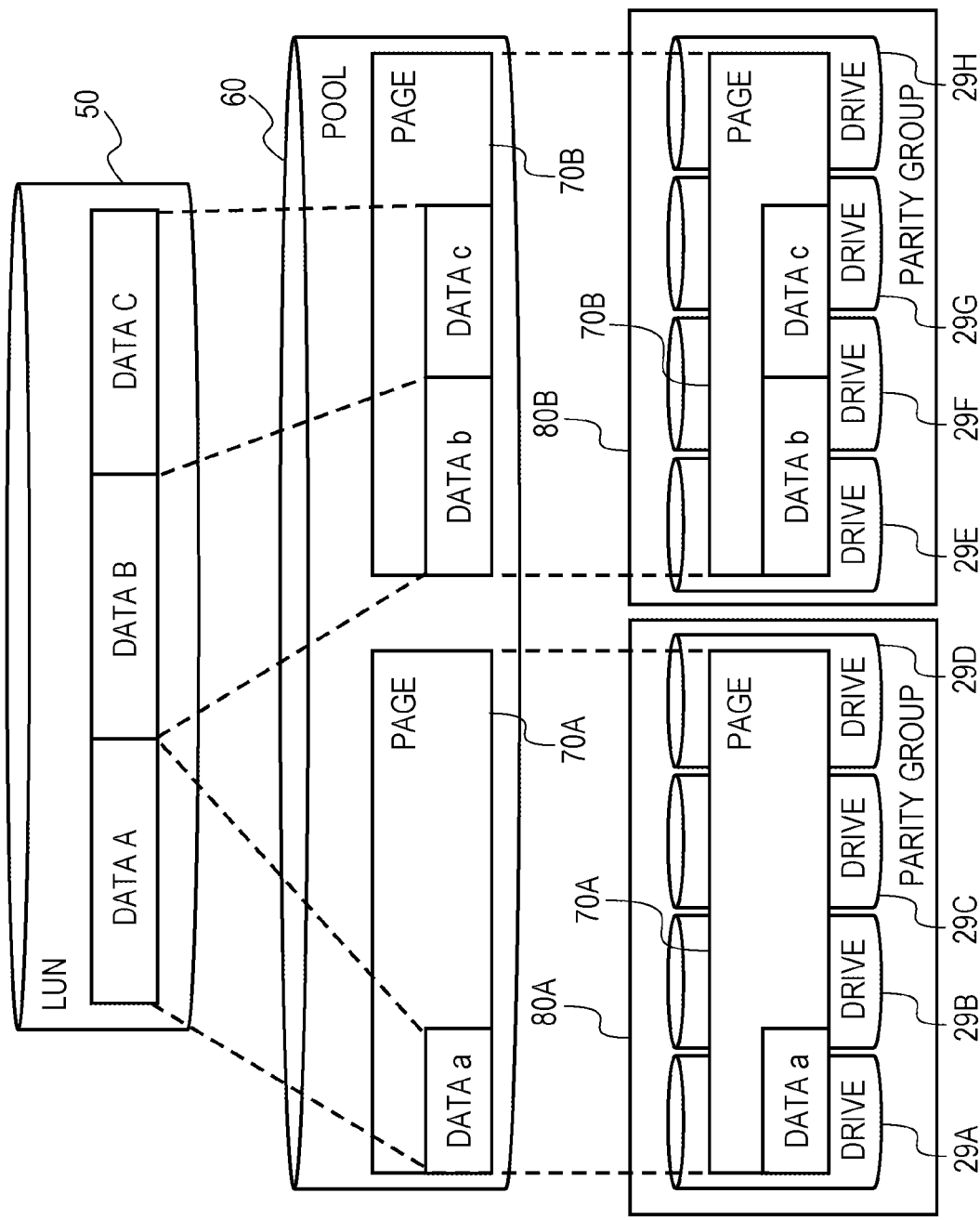
FIG. 3 is a diagram illustrating a logical composition according to an example.

FIG. 3 is a diagram describing a storage logical composition according to the present embodiment. LUN 50 is a logical drive recognized by the host computer 40, and host I/O is executed with respect to a logical address space on the LUN 50.

The pool 60 is a logical storage area (also simply referred to as a logical area) associated with one or more LUNs 50 and one or more parity groups. In the present example, the host data stored in the LUN 50 is compressed and/or de-duplicated and stored in the pool 60. For example, each of data A, data B, and data C in the LUN 50 is compressed to generate data a, data b, and data c, which are stored in the pool 60. Data a is stored in page 70A, and data b and data c are stored in the page 70B. Note that data reduction process such as compression/deduplication process may be omitted.

The pool 60 is managed by the page 70. The page 70 is a unit area for managing the pool 60, and is associated with a logical storage area in the parity group 80. The pool 60 is a hierarchy called a postscript space, and the compressed data is arranged in a front justified manner in each page 70. As a result, data can be efficiently stored.

In both the update write and the new write by the host computer 40, the received host data (write data) is stored at the head of the free area in the page 70. When the existing host data (existing) is updated by the host computer 40, the new host data is stored at the head of the free area in the page 70, and the originally stored old host data becomes invalid data (garbage).

The page 70 is a logical storage area for storing data. The page 70 is associated with a logical storage area in the parity group 80 including a plurality of drives 29. In the configuration example of FIG. 3, the page 70A in the pool 60 is allocated to the parity group 80A, and the page 70B is allocated to the parity group 80B.

The parity group 80 includes a plurality of drives 29. By combining the plurality of drives 29 to configure a logical storage medium, redundancy is ensured when a drive in the parity group 80 breaks down. The logical storage area of the parity group 80 is associated with the physical storage area of the drive 29.

As illustrated in FIG. 3, the storage logical composition has a hierarchical structure, and the storage device 11 manages data in a plurality of logical hierarchies. FIG. 3 illustrates a hierarchy of the LUN 50, a hierarchy of the parity group 80, and a hierarchy of the pool 60 therebetween. As described above, the hierarchy of the pool 60 is a postscript hierarchy. Although FIG. 3 illustrates one LUN 50 and one pool 60, a plurality of LUNs and a plurality of pools can be defined in the storage device 11. The storage areas in the hierarchy are associated with storage areas in adjacent upper and/or lower hierarchies. Although FIG. 3 illustrates three logical hierarchies, other hierarchies may be defined.

<Host Address Management Table>

FIG. 4 is a diagram describing a host address management table 201 according to the present example. The host address management table 201 is managed by the CPU 24, and for example, is stored in the drive 29 and loaded into the memory 25. Each entry of the host address management table 201 records a page number corresponding to a range of the host LBA (logical block address) on the LUN and an address range in the page. Each column of the host address management table 201 will be described below.

The column 2011 records the host LBA range on the LUN. The column 2012 records an identifier (page number) of a page to be mapped to the host LBA range. The column 2013 records an address range in the page to be mapped to the host LBA range.

<Metadata Management Table>

FIG. 5 is a diagram describing a metadata management table 202 according to the present example. The metadata management table 202 is managed by the CPU 24, and for example, is stored in the drive 29 and loaded into the memory 25. Each entry of the metadata management table 202 is a table that manages a correspondence relationship between a logical address of the data included in each page 70 and a physical address (an address in the parity group 80) that is a storage destination of the data.

Specifically, the column 2021 records the identifier (page number) of the page. The column 2022 records a start address of the address range in the page. The column 2023 records the start address of the address range in the parity group 80. For ease of description, the address in the parity group 80 is referred to as a physical address for the sake of convenience. The column 2024 records the data size of the host data before compression. The column 2025 records the data size of the host data after compression.

<Page Management Table>

FIG. 6 is a diagram describing a page management table 203 according to the present example. The page management table 203 is managed by the CPU 24, and for example, is stored in the drive 29 and loaded into the memory 25. Each entry of the page management table 203 records a correspondence relationship of a page 70 which is a logical recording area, a number of a parity group 80 associated with the page 70, and an address range corresponding to the page 70 in the parity group 80. In addition, a garbage amount included in the page 70 and an end address (previous postscript position) at which postscript has been performed last in the page are recorded. Each column of the page management table 203 will be described below.

Column 2031 records a number indicating the page 70. Column 2032 records a number indicating the parity group 80 to which the page 70 is allocated. Column 2033 records the address in the parity group 80 corresponding to the page 70.

Column 2034 records the amount of garbage (invalid data) included in the page 70. Column 2035 records a position (end address) at which the postscript is performed last in the page 70. The postscript process is executed from the head address of the page 70 in a front justified manner. Therefore, the area after the end address is an area where data is not stored (i.e., data can be written).

<Parity Group Management Table>

FIG. 7 is a diagram describing a parity group management table 204 according to the present example. The parity group management table 204 is managed by the CPU 24, and for example, is stored in the drive 29 and loaded into the memory 25. The parity group management table 204 has a data structure in which a parity type of a parity group and a drive number list belonging to the parity group 80 are recorded for each parity group in the storage system.

Each column of the parity group management table 204 will be described below. Column 2041 records the number of the parity group 80 included in the storage system 100. Column 2042 records the parity type of the corresponding parity group 80. Column 2043 records a drive number list belonging to the corresponding parity group 80.

<Drive Management Table>

Figure 8:
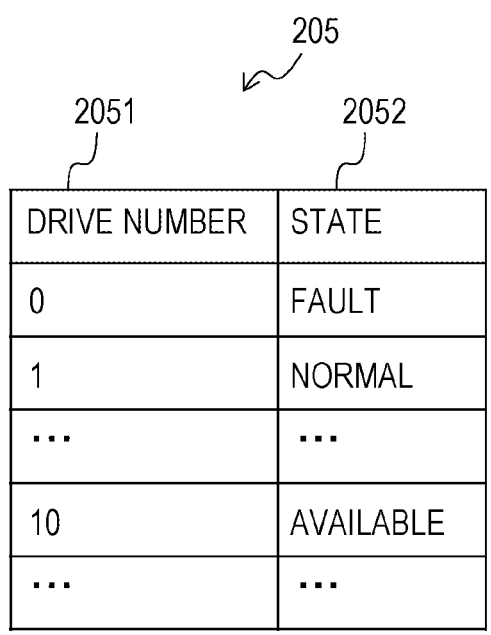
FIG. 8 is a diagram illustrating a drive management table according to an example.

FIG. 8 is a diagram describing a drive management table 205 according to the present embodiment. The drive management table 205 is managed by the CPU 24, and for example, is stored in the drive 29 and loaded into the memory 25. In order to manage each drive 29 included in the storage system, an identifier is given to each drive 29. The drive management table 205 has a data structure in which the drive number and the state of the drive 29 are recorded for each drive 29 included in the storage system.

Each column of the drive management table 205 will be described below. Column 2051 records a drive number which is an identifier given to each drive 29 included in the storage system 100.

Column 2052 records the state of the corresponding drive 29. The state "normal" means that the drive 29 is associated with the parity group 80 and no failure has occurred. The state "failure" means that the drive is associated with the parity group 80 and a failure has occurred. The state "available" means that the drive 29 is not associated with the parity group 80.

<Write Process>

Figure 9:
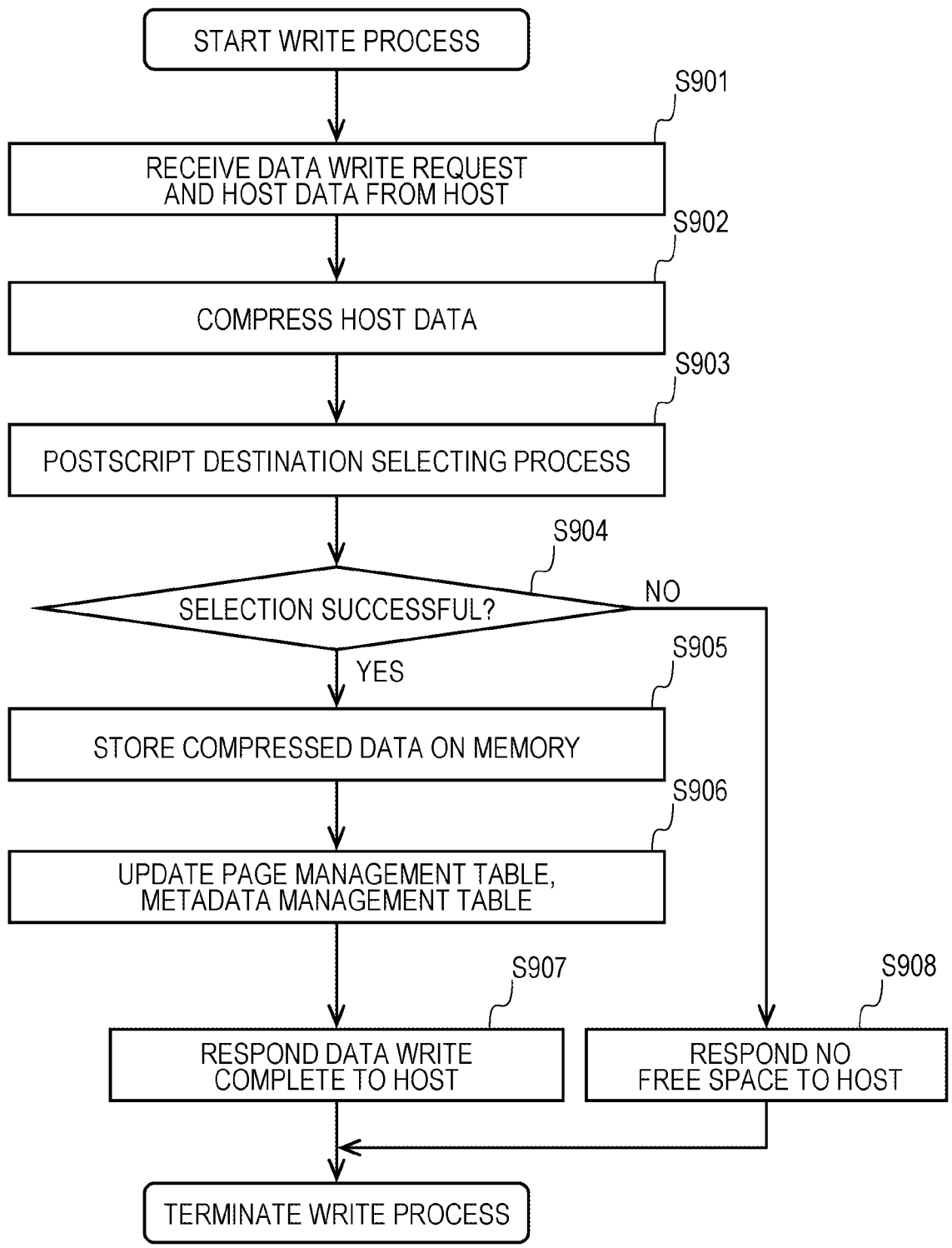
FIG. 9 is a diagram illustrating a write process in an example.

FIG. 9 is a diagram describing a processing flow of the write process according to the present example. The write process is a process of receiving a write request from the host computer 40 and recording data in the storage device 11. In the write request, for example, a LUN ID and a logical address of a write destination are designated by the host computer 40.

Hereinafter, a processing flow of the write process will be described with reference to FIG. 9.

S901: The CPU 24 receives a host data write request and host data from the host computer 40.

S902: The CPU 24 applies compression processing to the host data received from the host computer 40 to obtain compressed data. Note that this compression process may be performed by the CPU 24 itself, or in a case where hardware capable of executing the compression process is included in the storage device 11, the hardware may be caused to execute the compression process.

S903: The CPU 24 selects the page 70 of the destination to write (perform postscript for) the compressed data. The CPU 24 refers to the page management table 203, the parity group management table 204, and the drive management table 205, and sets the page 70 in which the failure drive is not included in the parity group 80 as a postscript destination page candidate.

The CPU 24 selects a page in which the compressed data can be stored as the postscript destination among the candidates of the postscript destination page. Specifically, the size from the final postscript position of the relevant page to the page end is set as an in-page free area, and a page 70 in which the in-page free area is larger than the size of the compressed data is selected as a postscript destination.

S904: When the page satisfying the condition can be selected as the postscript destination in step S903, the CPU 24 proceeds to step S905. When there is no page satisfying the condition, the process proceeds to step S908.

S905: The CPU 24 stores the compressed data in the memory 25.

S906: The CPU 24 increases the value of the garbage amount 2034 in the page management table 203 by the size of the written host data. In addition, the value of the previous postscript position 2035 is updated with the value of the postscript position where the compressed data is stored this time. In addition, the values of the physical address 2023, the pre-compression size information 2024, and the post-compression size information 2025 corresponding to the page number 2021 in the metadata management table 202 and the logical address 2022 in the page are respectively updated.

S907: The CPU 24 returns a response of completion of data write process to the host computer 40, and terminates the process.

S908: The CPU 24 returns a response indicating that the data write process failed due to lack of free space to the host computer 40, and terminates the process.

<Data Recovery Process>

Figure 10:
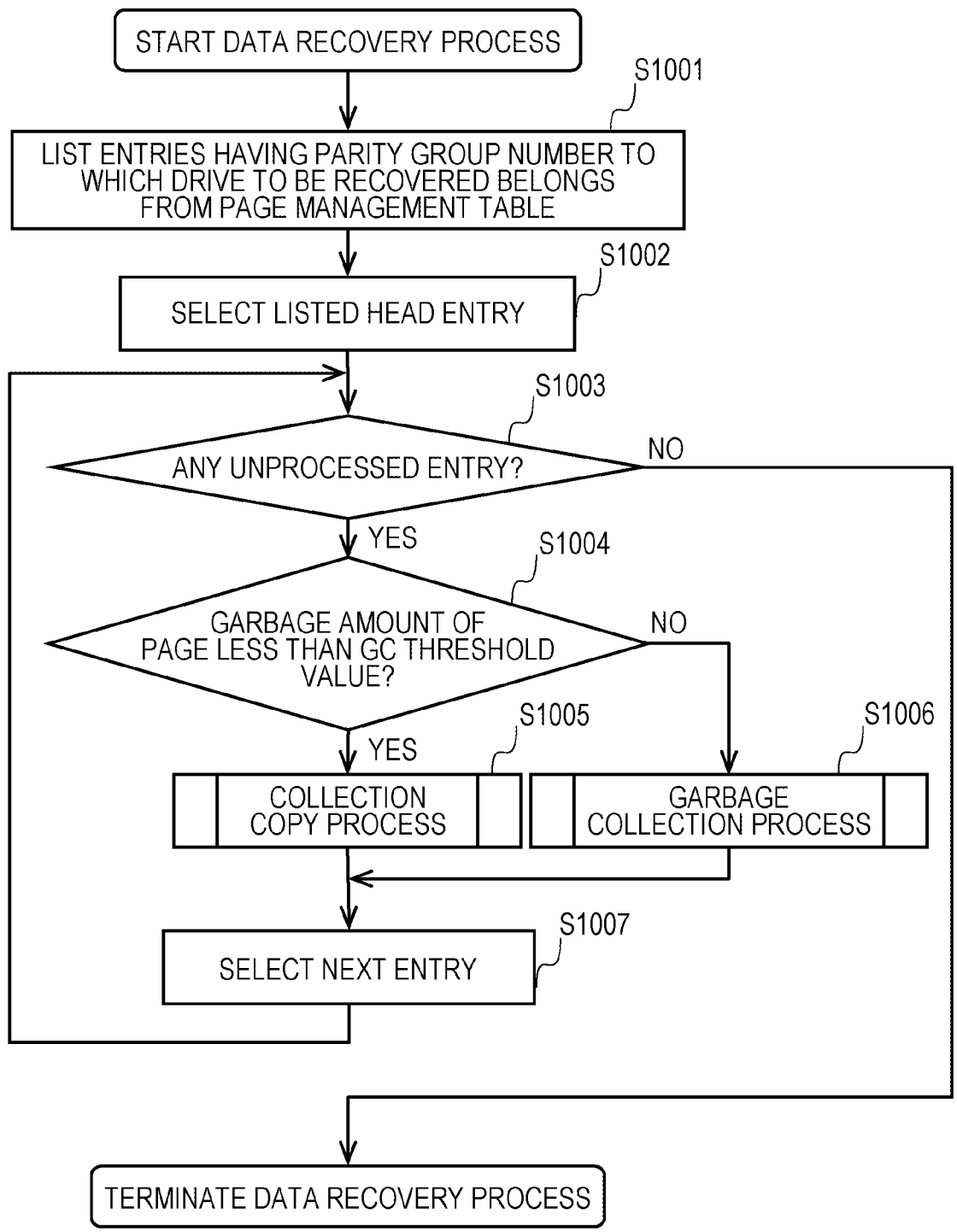
FIG. 10 is a diagram illustrating a data recovery process in an example.

FIG. 10 is a diagram describing a processing flow of the data recovery process according to the present example. The data recovery process starts when the failure drive 29 is replaced with the new drive 29. Hereinafter, a processing flow of the data recovery process will be described with reference to FIG. 10.

S1001: The CPU 24 refers to the parity group management table 204 to obtain the parity group number to which the recovery target drive 29 belongs. Thereafter, the page management table 203 is referred to and the page 70 having the parity group number is listed.

S1002: The CPU 24 selects the head entry of the page 70 (entry) listed in step S1001 as the processing target entry 70.

S1003: The CPU 24 determines whether or not an unprocessed entry 70 remains in the entries 70 listed in step S1001. In a case where an unprocessed entry remains, the process proceeds to step S1004. In a case where the unprocessed entry 70 does not remain, since the restoration of all the pages 70 allocated to the parity group 80 to which the recovery target drive 29 belongs is completed, the data recovery process is completed.

S1004: The CPU 24 refers to the page management table 203 and acquires the garbage amount included in the target page 70. Thereafter, the garbage amount is compared with a garbage collection execution threshold value described later. The garbage amount can be represented by, for example, a ratio of garbage with respect to a page size. When the garbage amount is greater than or equal to the garbage collection execution threshold value, the page 70 is set as a garbage collection target, and the process proceeds to step S1005. Otherwise, the page 70 is set as a collection copy target, and the process proceeds to step S1006.

Here, the garbage collection threshold value is a value used when determining whether or not to execute the garbage collection on the page 70 in the data recovery process, and the value is set to, for example, a value that is the same as or smaller than the garbage collection threshold value in the normal operation other than the data recovery process. For example, the garbage collection threshold value at the time of normal operation of the page allocated to the parity group including the normal drive can be determined mainly on the basis of the following requirements.

(X1) Requirements regarding number of drives mounted on the storage system (X2) Requirements regarding garbage collection efficiency (X3) Requirements regarding lifespan of the drive In the garbage collection process, the larger the amount of garbage included in the page 70, the larger the amount of garbage that can be collected. Therefore, when the garbage collection threshold value is set to a high value, the recovery speed of the free space improves.

On the other hand, when a large amount of garbage is accumulated in the page 70, the ratio of valid data per page 70 decreases, and thus a larger storage area is required to hold the same amount of valid data.

When the garbage collection threshold value is set to a low value, the utilization efficiency of the storage area is improved, so that the number of drives required to be mounted on the storage device 11 can be suppressed. On the other hand, since the garbage collection process is frequently operated and the copy process of the valid data is frequently performed, the consumption of the lifespan of the drive is accelerated and the operation cost for a long period of time is increased.

The garbage collection threshold value at the time of the normal operation is set so as to satisfy each requirement in consideration of the requirements described in (X1) to (X3).

For example, a threshold used by the garbage collection process in the normal operation can be used as the garbage collection threshold value when selecting the garbage collection target page in the data recovery process. As a result, the garbage collection efficiency when compared with the garbage collection process in the normal operation can be maintained.

The garbage collection threshold value in the data recovery process may be larger than 0 and smaller than the garbage collection threshold value in the normal operation. As a result, the target data of the collection copy process in the data recovery process can be reduced, and the time of the data recovery process can be further shortened. The garbage collection requires a process for selecting valid data, and can be inefficient for an excessively small amount of garbage. The determination of the garbage collection threshold value in the data recovery process may take this viewpoint into consideration.

S1005: The CPU 24 executes a collection copy process to be described later on the target entry.

S1006: The CPU 24 executes a garbage collection process to be described later on the target entry.

S1007: When the collection process or the garbage collection process is completed, the CPU 24 selects a next entry from the entry list listed in step S1001.

Note that the collection copy process and the garbage collection process on each page 70 may be executed synchronously or may be executed asynchronously with respect to the data recovery process. In a case where the processes are performed asynchronously, the data recovery process is completed when the collection copy process or the garbage collection process with respect to all the pages 70 to be subjected to the data recovery process is completed.

<Collection Copy Process>

Figure 11:
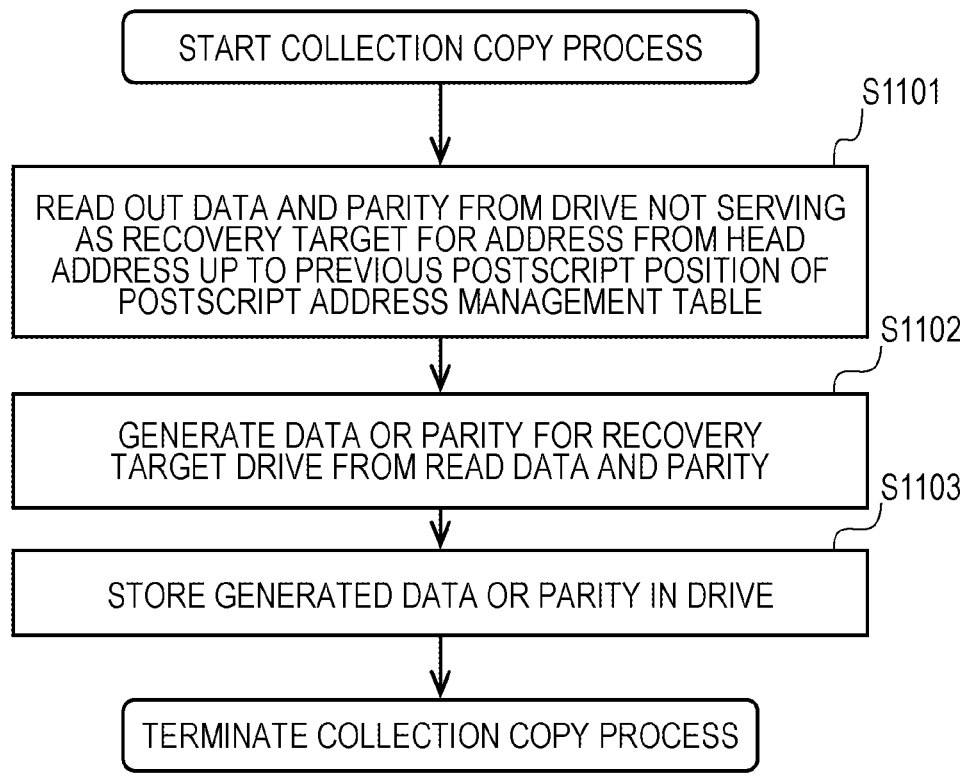
FIG. 11 is a diagram illustrating a collection copy process in an example.

FIG. 11 is a diagram describing a processing flow of the collection copy process S1005 according to the present example. The collection copy process is a process of restoring data and parity included in the target page 70 and storing the data and parity in the recovery target drive at the time of drive recovery. The restored data includes invalid data in addition to valid data.

Hereinafter, a processing flow of the collection copy process will be described with reference to FIG. 11.

S1101: The CPU 24 reads the data and the parity from the drive not serving as the recovery target for an address range from the head address of the target page 70 to the previous postscript position.

S1102: The CPU 24 generates data or parity for the recovery target drive from the data and parity read in step S1101.

S1103: The CPU 24 stores the generated data or parity in the drive 29.

<Garbage Collection Process>

Figure 12:
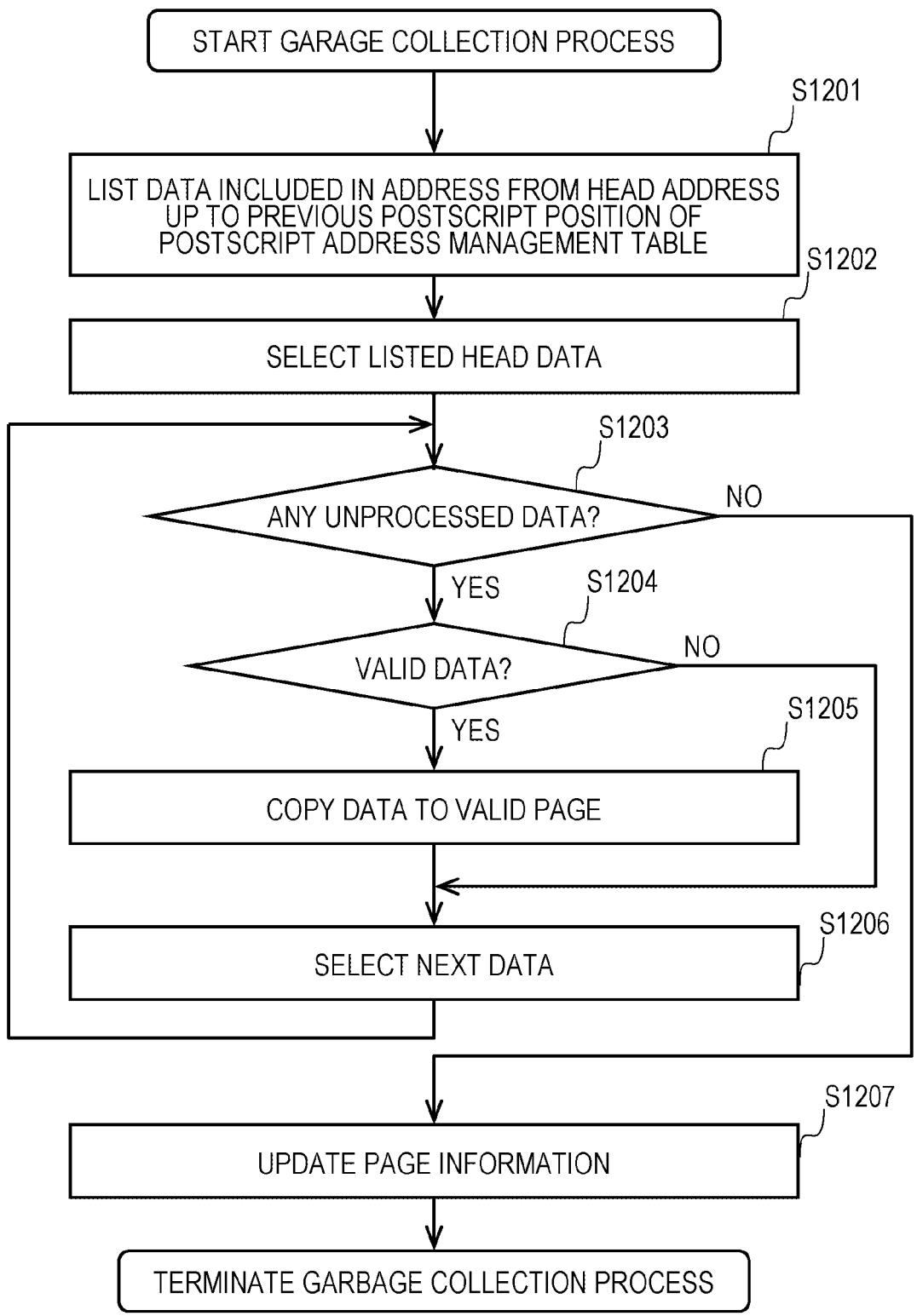
FIG. 12 is a diagram illustrating a garbage collection process in an example.

FIG. 12 is a diagram describing a processing flow of the garbage collection process according to the present example. The garbage collection process is a process of transferring only the valid data among the valid data and the invalid data (garbage) included in the target page 70 to another page and then discarding the target page 70 to release a storage area occupied by the garbage and making it reusable. Note that the garbage collection process is also executed at the time of normal operation other than the data recovery process.

Hereinafter, a processing flow of the garbage collection process will be described with reference to FIG. 12.

S1201: The CPU 24 refers to the page management table 203 and lists data included in the address range from the head address of the target page to the previous postscript position.

S1202: The CPU 24 selects the head data among the data listed in step S1101 as a processing target.

S1203: The CPU 24 determines whether or not an unprocessed data remains among the data listed in step S1201. When unprocessed data remains, the process proceeds to step S1004. When no unprocessed data remains, all the valid data included in the page 70 have been transferred to another page 70, and thus the garbage collection process is completed.

S1204: The CPU 24 refers to physical address information 2023 and logical address information in the metadata management table 202, and determines whether or not the target data is valid data. When a corresponding logical address exists for the physical address where the target data is located, the target data is determined to be valid data. Otherwise, the target data is determined to be not valid data. In a case of the valid data, the process proceeds to step S1205. In a case of not the valid data, the process proceeds to step S1206.

S1205: The CPU 24 copies the target data to another page 70 in the pool 60. At this time, as the page 70 of the copy destination, a page 70 that does not belong to the parity group 80 to be subjected to the data recovery process is selected. For example, a page of the parity group 80 including a normal drive not including a failure drive is selected. Thus, the data can be avoided from further being subjected to data recovery at the copy destination.

S1206: The CPU 24 selects the next data from the data listed in step S1201, and the process proceeds to step S1203.

S1207: The CPU 24 refers to the page management table 203 and rewrites the value of the garbage amount 2034 and the value of the previous postscript position 2035 to initial values among the entries corresponding to the target page 70.

In step S1205, the page 70 that does not belong to the parity group 80 to be subjected to the data recovery process is selected as the copy destination page 70 of the valid data, so that the data is not subjected to the collection copy process or the garbage collection process again in the data recovery process.

Through the above process, all the valid data in the target page 70 are transferred to the copy destination page 70, and thus the collection copy process related to the target page does not need to be performed.

As described above, in the data recovery process, the processing efficiency can be improved by selectively using the garbage collection process or the collection copy process according to the garbage amount for each page 70 to be restored.

Note that the present invention is not limited to the examples described above, and includes various modified examples. For example, the examples described above have been described in detail for the sake of easy understanding of the present invention, and are not necessarily limited to those having all the described configurations. In addition, a part of the configuration of a certain example can be replaced with a configuration of another example, and the configuration of a certain example can be added with the configuration of another example. Furthermore, for a part of the configuration of each example, other configurations can be added, deleted, and replaced.

In addition, some or all of the above-described configurations, functions, processing units, and the like may be realized by hardware, for example, by designing with an integrated circuit. In addition, each of the above-described configurations, functions, and the like may be realized by software by a processor interpreting and executing a program for realizing each function. Information such as a program, a table, and a file for realizing each function can be stored in a recording device such as a memory, a hard disk, and a solid state drive (SSD), or a recording medium such as an IC card and an SD card.

In addition, control lines and information lines that are considered necessary for the description are shown, and not all control lines and information lines are necessarily shown in terms of product. In practice, it may be considered that almost all the configurations are connected to each other.

What is claimed is:

1. A storage device that manages data stored in a storage drive in a plurality of logical hierarchies, the storage device comprising:
   a host interface that communicates with a host; and
   a processor; wherein
   the plurality of logical hierarchies include a writing hierarchy above a hierarchy of a parity group including a plurality of storage drives; and
   the processor
      writes host data received via the host interface to a free area in the writing hierarchy, and
      executes, in a data recovery process for replacing a failure storage drive with a new storage drive, a garbage collection process on a first logical area in the writing hierarchy associated with a first parity group including the failure storage drive, and in the garbage collection process, valid data is selected from the first logical area and copied to a second logical area associated with a second parity group different from the first parity group, wherein the processor determines to execute the garbage collection process on a logical area in the writing hierarchy associated with the first parity group in which a garbage amount is greater than or equal to a first threshold value, wherein the processor executes the garbage collection process on a logical area where a garbage amount is greater than or equal to a second threshold value among logical areas in the writing hierarchy allocated to a parity group including a normal storage drive outside the data recovery process, and the first threshold value is less than or equal to the second threshold value.

2. The storage device according to claim 1, wherein the processor selects a parity group configured by the normal storage drive as the second parity group.

3. The storage device according to claim 1, wherein the processor executes a collection copy process on each of the logical areas not subjected to the garbage collection process associated with the first parity group, and the collection copy process stores data and parity restored from the data and the parity of the normal storage drive in the first parity group in the new storage drive.

* * * * *